(12) United States Patent
Shi

(10) Patent No.: US 11,078,044 B2
(45) Date of Patent: Aug. 3, 2021

(54) RING ASSEMBLY FOR ELEVATOR GOVERNOR, GOVERNOR AND ELEVATOR SYSTEM

(71) Applicant: Otis Elevator Company, Farmington, CT (US)

(72) Inventor: Zhengbao Shi, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 682 days.

(21) Appl. No.: 15/868,617

(22) Filed: Jan. 11, 2018

(65) Prior Publication Data

US 2018/0201480 A1    Jul. 19, 2018

(30) Foreign Application Priority Data

Jan. 13, 2017    (CN) .......................... 201710024109.2

(51) Int. Cl.
*B66B 5/04*    (2006.01)
*F16D 7/00*    (2006.01)

(52) U.S. Cl.
CPC ................ *B66B 5/044* (2013.01); *F16D 7/00* (2013.01)

(58) Field of Classification Search
CPC ............ B66B 5/044; F16D 7/00; F16D 7/028
See application file for complete search history.

(56) References Cited

U.S. PATENT DOCUMENTS

| 3,695,399 | A |   | 10/1972 | Laing |
| 3,741,527 | A | * | 6/1973 | Dahl ...................... F16D 43/218 254/350 |
| 3,966,027 | A |   | 6/1976 | Plitzkow |
| 4,095,681 | A | * | 6/1978 | David ...................... B66B 5/044 187/352 |

(Continued)

FOREIGN PATENT DOCUMENTS

| CN | 2934166 Y | 8/2007 |
| CN | 201211987 Y | 3/2009 |

(Continued)

OTHER PUBLICATIONS

Machine Translation of CN 105565104.*

(Continued)

*Primary Examiner* — Diem M Tran
(74) *Attorney, Agent, or Firm* — Cantor Colburn LLP

(57) ABSTRACT

The present invention provides a core ring assembly for an elevator governor, a governor and an elevator system, wherein the core ring assembly comprises: a first portion and a second portion of a core ring which are axially arranged, the first portion and the second portion of the core ring having contact surfaces therebetween; and a pressure generation mechanism for generating a pressure between the first portion and the second portion of the core ring, wherein the first portion of the core ring rotates by receiving an actuation torque from an over-speed actuating mechanism, and the second portion of the core ring rotates with the first portion of the core ring by virtue of friction of the contact (Continued)

surfaces and enables a safety activating module. The core ring assembly provided by the embodiment of the present invention has a peak torque limiting function and a compact structure.

19 Claims, 5 Drawing Sheets

(56) References Cited

U.S. PATENT DOCUMENTS

| | | | |
|---|---|---|---|
| 4,257,494 A * | 3/1981 | Frankel | B66B 5/044 |
| | | | 187/373 |
| 4,856,623 A | 8/1989 | Romig, Jr. | |
| 5,007,505 A | 4/1991 | Lindegger | |
| 5,201,821 A | 4/1993 | Ericson et al. | |
| 5,630,483 A | 5/1997 | Karner | |
| 5,904,229 A | 5/1999 | Timari | |
| 8,118,143 B2 * | 2/2012 | Brandt | F16D 51/12 |
| | | | 188/184 |
| 8,453,799 B2 | 6/2013 | Mueller et al. | |
| 2013/0098711 A1 | 4/2013 | Aguado et al. | |

FOREIGN PATENT DOCUMENTS

| | | |
|---|---|---|
| CN | 102224358 A | 10/2011 |
| CN | 102574664 A | 7/2012 |
| CN | 102892699 A | 1/2013 |
| CN | 105502126 A | 4/2016 |
| CN | 105565104 A | 5/2016 |
| DE | 2744908 A1 | 4/1979 |
| DE | 2931732 A1 | 2/1981 |
| DE | 19536995 A1 | 4/1997 |
| EP | 0001409 A1 | 4/1979 |
| EP | 1598302 A1 | 11/2005 |
| EP | 2368058 A2 | 9/2011 |
| JP | 2006306570 A | 11/2006 |
| WO | 2009130366 A1 | 10/2009 |
| WO | 2011048270 A1 | 4/2011 |
| WO | 2013180721 A1 | 12/2013 |

OTHER PUBLICATIONS

Chinese First Office Action for application CN 201710024109.2, dated Mar. 17, 2020, 8 pages.

Sidney Manufacturing Company, "Special Purpose Personnel Elevator Manual", available at: http://www.sidneymanufacturing.com/sites/default/files/2012%20New%20Manlift%20Manual.pdf, Mar. 1, 2012, 110 pages.

European Search Report for application EP 18151412.6, dated Jul. 16, 2018, 9 pages.

* cited by examiner

RING ASSEMBLY FOR ELEVATOR GOVERNOR, GOVERNOR AND ELEVATOR SYSTEM

FOREIGN PRIORITY

This application claims priority to Chinese Patent Application No. 201710024109.2, filed Jan. 13, 2017, and all the benefits accruing therefrom under 35 U.S.C. § 119, the contents of which in its entirety are herein incorporated by reference.

TECHNICAL FIELD

The present invention relates to the technical field of elevator governors. In particular, the present invention relates to a core ring assembly for an elevator governor, an elevator governor having the same and an elevator.

BACKGROUND ART

A governor for an elevator has already been known, and is used to enable a switch to cut off power supplied to the elevator and/or to enable a safety device activating module when the elevator speed exceeds a certain range, so as to make a mechanical speed reducing mechanism work to reduce the speed of an elevator car and stop the elevator car.

U.S. patent (Publication No.: US20130098711A1) discloses a car-mounted governor. Differing from a traditional governor with or without a machine room, the car-mounted governor is mounted on a car to ascend or descend with the car. This type of car-mounted governor may be applied to various buildings, especially scenarios where it is not suitable for arranging a governor with or without a machine room. At present, there are many problems to be urgently solved in application of the car-mounted governor to high-speed elevators.

SUMMARY OF THE INVENTION

The purpose of the present invention is to provide a core ring assembly of a governor to solve or at least relieve the problems existing in the prior art.

The purpose of the present invention is to decrease a tensile force exerted on a rope on a governor sheave when the governor is actuated.

The purpose of the present invention is further to prevent the tensile force exerted on the rope in a governor assembly from changing obviously with the height of a car when the governor is actuated, thereby lowering the strict requirement on the rope.

The purpose of the present invention is further to reduce excessive harmful force output of a safety activating module.

Other purposes of the present invention will become obvious upon reading the specification.

According to one aspect of the present invention, a core ring assembly for an elevator governor is provided. The core ring assembly comprises: a first portion and a second portion of a core ring which are axially arranged, the first portion and the second portion of the core ring having contact surfaces therebetween; and a pressure generation mechanism for generating a pressure between the first portion and the second portion of the core ring, wherein the first portion of the core ring rotates by receiving an actuation torque from an over-speed actuating mechanism, and the second portion of the core ring rotates with the first portion of the core ring by virtue of friction of the contact surfaces and enables a safety activating module.

According to other aspects of the present invention, a governor and an elevator system provided with the core ring assembly according to the embodiments of the present invention are further provided.

BRIEF DESCRIPTION OF THE DRAWINGS

The disclosure of the present invention will be readily understood with reference to the accompanying drawings. It is obvious to one skilled in the art that these drawings are merely for the purpose of description instead of limiting the protective scope of the present invention. Besides, similar numbers in the drawings are used for designating similar components, in which.

DETAILED DESCRIPTION

It can be easily understood that one skilled in the art can put forward various mutually replaceable structural forms and implementation modes according to the technical solutions of the present invention without deviating from the essential spirit of the present invention. Therefore, the following implementation modes and drawings are only used for exemplarily describing the technical solutions of the present invention, and shall not be considered as all of the present invention or as limitations or restrictions to the technical solutions of the present invention.

Positional terms such as "above", "below", "left", "right", "front", "rear", "front side", "back side", "top" and "bottom" which are mentioned or may be possibly mentioned in the description are defined relative to a construction shown in each of the drawings, and are relative concepts and thus may be correspondingly changed according to different locations and different use states thereof. Therefore, these or other positional terms shall not be explained as restrictive terms.

Figure 1:
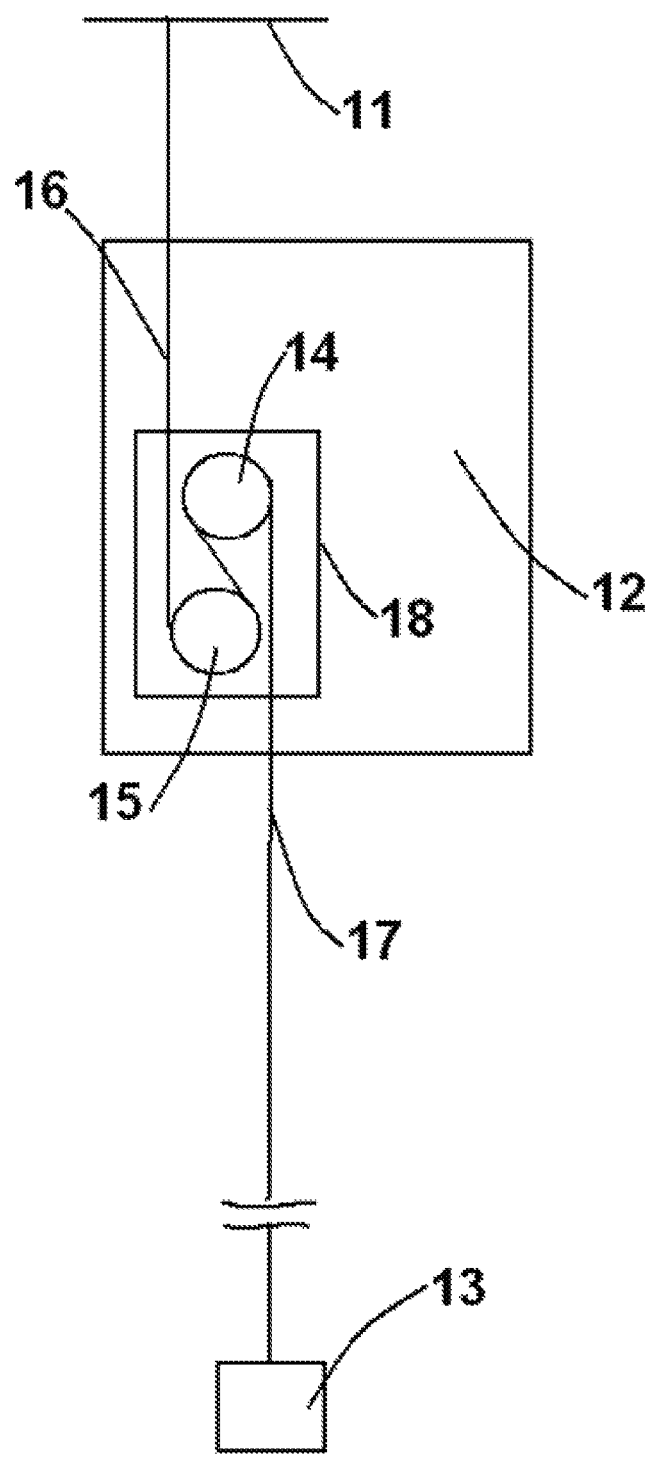
FIG. 1 illustrates a schematic view of an elevator system having a car-mounted governor.

Firstly, refer to FIG. 1 which illustrates an elevator system having a car-mounted governor assembly. It should be understood that although the embodiments of the present invention are described for the car-mounted governor assembly, the core ring assembly provided by the present invention may be used for various governors which are not limited to the types of governors given in the views or embodiments. FIG. 1 illustrates a car 12 on which a governor assembly 18 is mounted. In regard to a typical governor assembly 18, for example, a reference may be made to the type recited in U.S. patent (publication No.: US20130098711A1) of Otis company disclosed on Apr. 25, 2013, which is incorporated herein by reference in its entirety. The governor assembly 18 comprises a guide wheel 15 and a governor sheave 14. A rope sagging down from a hoistway top 11 is wound around the guide wheel 15 and the governor sheave 14. The rope has a governor upstream rope portion 16 and a governor downstream rope portion 17. During ascending or descending of the car, the lengths of the governor upstream rope portion 16 and the governor downstream rope portion 17 continuously change. At a hoistway bottom, a counterweight 13 is suspended at a bottom end of the governor downstream rope portion 17, or the bottom end is connected to a traction device for providing a tensile force to the rope. During ascending and descending of the car 12, the guide wheel 15 and the governor sheave 14 will rotate as a result of friction with the rope. A pitch circle rotational linear speed of the governor sheave 14 is consistent with an operating speed of the car. When a descending speed of the elevator car exceeds a critical value, an over-speed actuating mechanism, such as a centrifugal mechanism, associated with the governor sheave 14 triggers a safety activating module since the rotational speed of the sheave exceeds the critical value, thereby activating a mechanical braking mechanism to stop the elevator car through braking. After the governor is triggered, the governor sheave 14 substantially cannot rotate while the car still moves a certain distance due to inertia and is gradually stopped through braking. At this moment, the rope wound on the sheave will slip on the sheave to produce sliding friction. If the elevator car is located at a high floor or a higher horizontal height at the moment of triggering, the governor downstream rope portion 17 located below the car or at the downstream of the governor assembly 18 will have a greater length and weight. The governor downstream rope portion 17 with the greater length and weight, and the gravity of the bottom counterweight 13 jointly cause the portion of the rope wound on the governor sheave 14 to have a larger tensioning force and a positive pressure with respect to the governor sheave 14. Herein, the tensile forces exerted on the governor upstream/downstream rope portions 16 and 17, and the maximum friction torque which can be produced by the governor upstream/downstream rope portions 16 and 17 to the governor sheave strictly follow Euler's formula. Under a situation of a large tensioning force, the rope and the governor sheave have a larger friction force therebetween during braking. As regulated in national standards, when the governor is triggered at a bottom floor, the produced tensile force needs to be larger than two times the minimum force required for pulling up a safety gear wedge and at least not smaller than 300 N. In order to guarantee this condition, the counterweight 13 needs to have a certain weight. As a result, when the governor is triggered at a higher horizontal position, the tensile force jointly produced by the counterweight 13 and the governor downstream rope portion 17 is larger. When the height of the floor increases and consequently the tensile force is too large, an excessive force output may be produced to the safety activating module, and an excessive tensile force may be produced to the rope. The excessive tensile force raises a higher requirement on the design of relevant components of the system. Besides, the national standards also require that the designed tension resistance of a steel wire rope of the governor should be at least greater than eight times the maximum tensile force (usually produced under a working condition that the governor is triggered at a higher horizontal position) exerted thereon during working. During the use in higher buildings or under working conditions of high-speed elevators, the requirement on the designed tension resistance of the rope is also stricter. However, an effective means to improve the designed tension resistance of the rope is to increase the diameter thereof, which will also increase the weight thereof and consequently cause a larger tensile force on the rope. This being the case, a pair of contradictions arises, i.e., it is expected that the rope has greater tension resistance but it is not expected to increase the diameter and the weight thereof. After thoroughly understanding this technical problem, the present invention provides an improved governor assembly according to the embodiment of the present invention.

Figure 2:
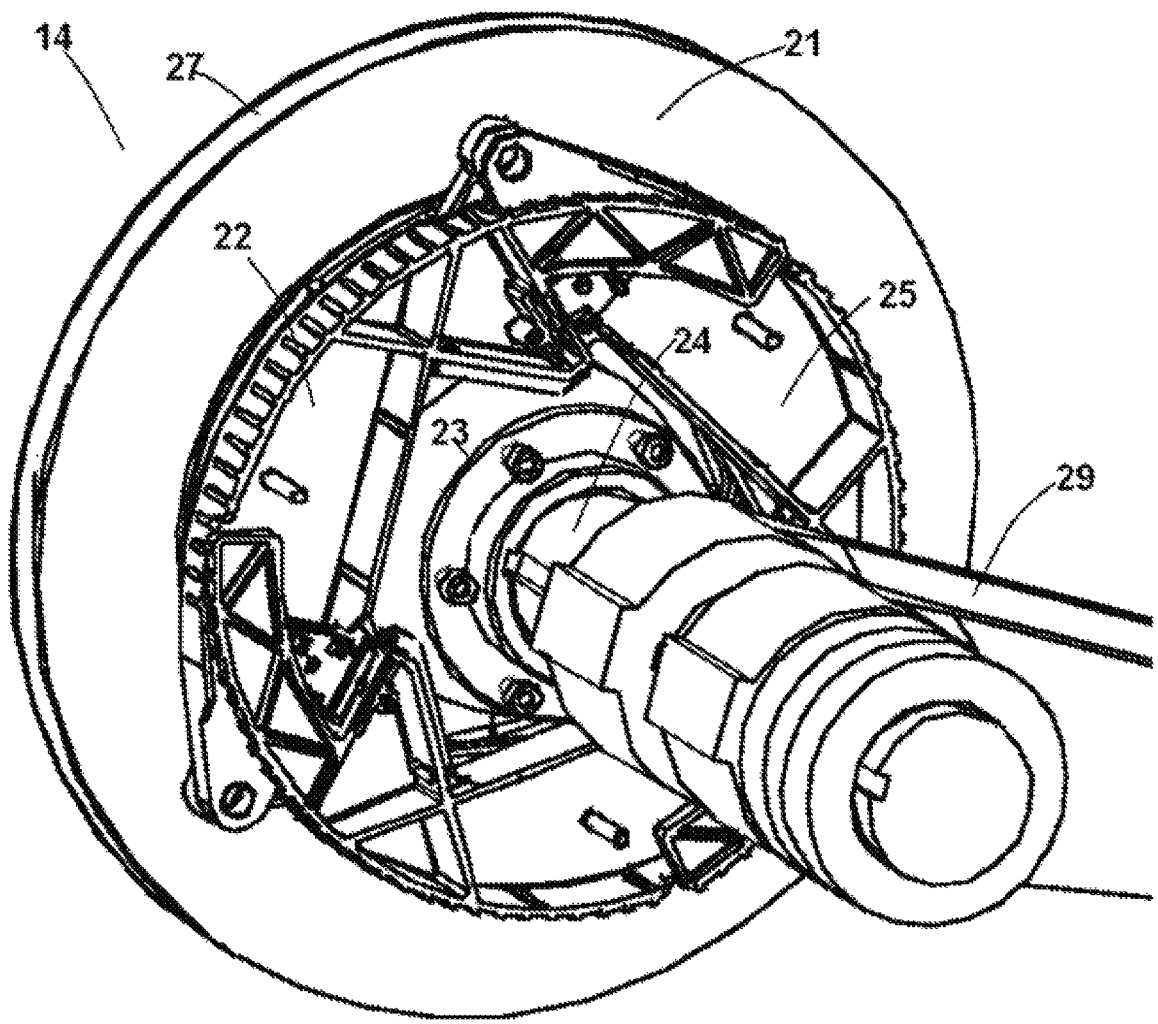
FIG. 2 illustrates an enlarged view of a governor assembly comprising a governor sheave, a centrifugal mechanism and a core ring assembly.

FIG. 2 illustrates an overall structure of the governor sheave 14 of the car-mounted governor assembly. Herein, the governor sheave 14 comprises a guide wheel 21, and the guide wheel 21 has a rope groove 27 on an outer circumference. The rope is wound in the rope groove 27 of the guide wheel 21 in a way illustrated in FIG. 1. During ascending and descending of the elevator car, the guide wheel 21 of the car-mounted governor assembly moves up and down together with the elevator car and rotates around a shaft thereof. An over-speed actuating mechanism, such as a centrifugal mechanism 22, and the guide wheel 21 are fixedly connected and rotate together. The centrifugal mechanism 22 comprises a plurality of centrifugal blocks 25, each of which being retained at a contracted position through an elastic mechanism such as a spring or an electromagnet. With the acceleration of the elevator, the rotational speeds of the guide wheel 21 and the centrifugal mechanism 22 increase accordingly. Till at an actuating position illustrated in FIG. 3, the centrifugal mechanism 22 is engaged with the core ring 23, thus driving the core ring 23 to rotate and subsequently driving an output mechanism connected with the core ring 23 to rotate, so as to enable the safety activating module. For example, the core ring 23 drives a shaft 24 connected therewith to rotate and drives a rod 29 to rotate to pull a safety gear and the like to brake the car.

Figure 3:
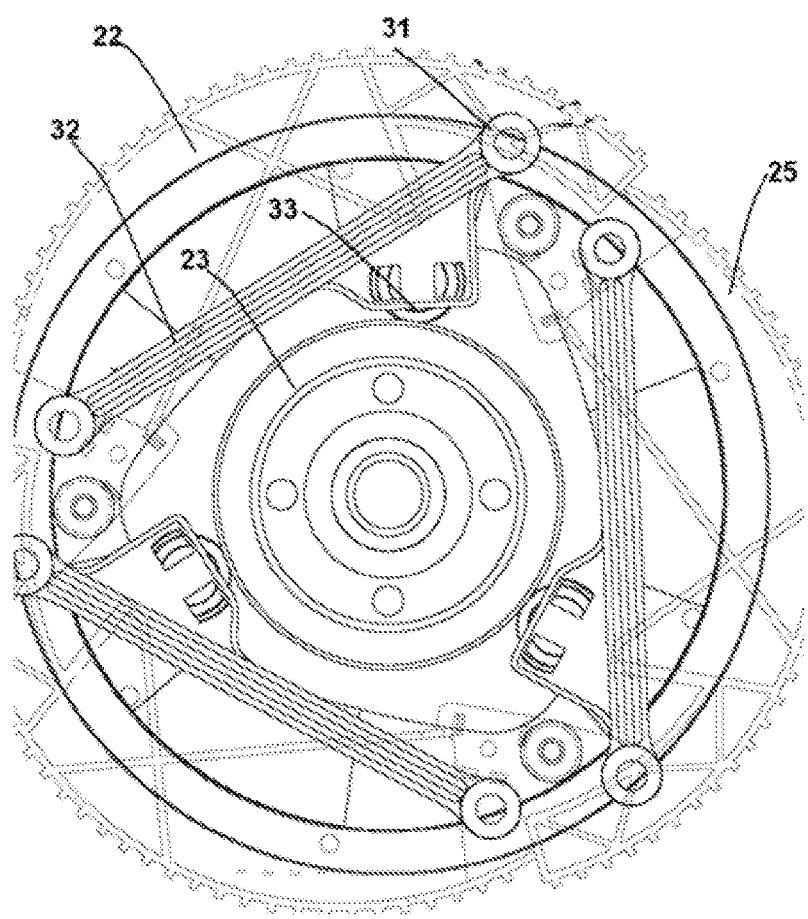
FIG. 3 illustrates a schematic view when a centrifugal mechanism engages a core ring assembly to transfer a torque.

FIG. 3 illustrates the centrifugal mechanism 22 of the governor assembly. Herein, the centrifugal blocks 25 are illustrated as transparent such that a rear structure is visible. Since the centrifugal force of the centrifugal mechanism 22 increases with the increase of the rotational speed, the centrifugal mechanism 22 is unfolded by overcoming the tensile force of the spring. Wheels 33 on inner sides of connecting rods 32 connected between the centrifugal blocks engage the core ring 23 with the unfolding of the centrifugal mechanism 22 to drive the core ring 23 to rotate.

Figure 4:
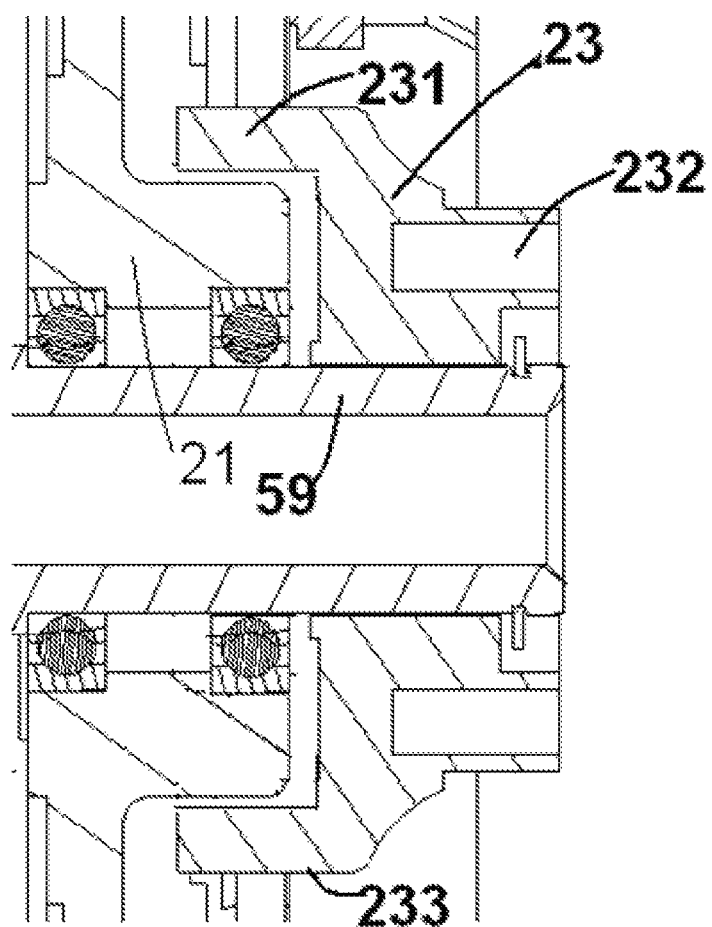
FIG. 4 illustrates a sectional view of a core ring.

FIG. 4 illustrates a section view of the core ring 23 according to one design. The core ring 23 in the prior art is a part or is integral; the core ring 23 comprises a body 231; and a periphery 233 of the body 231 is used for engaging the centrifugal mechanism 22, and more specifically, engaging the wheels 33 on the inner sides of each connecting rod 32 in the centrifugal mechanism 22. An inner ring of the body 231 of the core ring is rotatably sleeved on a fixed shaft 59, and a rear side thereof is provided with a concave part for accommodating a protruding portion of the guide wheel 21. The guide wheel 21 is mounted on the same fixed shaft 59 through a bearing. A front side of the core ring 23 is provided with a mounting feature 232, such as a mounting hole, for connecting parts associated with the safety activating module, so as to enable the safety activating module.

Figure 5:
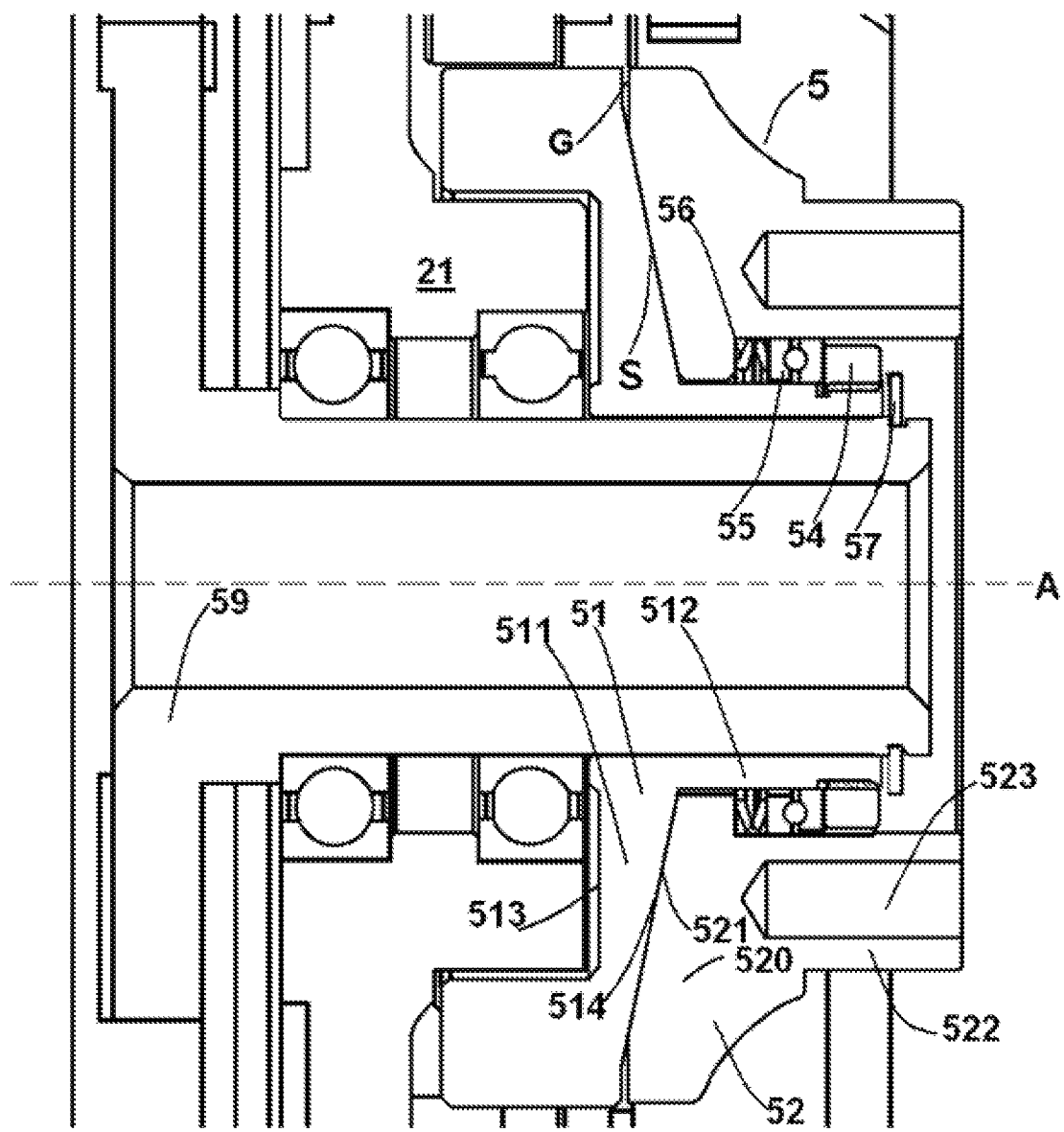
FIG. 5 illustrates a sectional view of a core ring assembly according to one embodiment of the present invention.

Then, refer to FIG. 5 which illustrates a core ring assembly 5 according to one embodiment of the present invention.

The core ring assembly 5 for the governor of the elevator according to the present invention comprises: a first portion 51 and a second portion 52 of a core ring which are axially arranged, the first portion 51 and the second portion 52 of the core ring having contact surfaces S therebetween; and a pressure generation mechanism for generating a pressure between the first portion 51 and the second portion 52 of the core ring, e.g., a pressure in an axial direction, wherein the first portion 51 of the core ring rotates by receiving an actuation torque from, for example, an over-speed actuating mechanism of the governor, and the second portion 52 of the core ring rotates with the first portion 51 of the core ring by virtue of friction of the contact surfaces S and enables a safety activating module.

In some embodiments, in order to increase the friction, the contact surfaces S between the first portion 51 and the second portion 52 of the core ring are conical surfaces. Taper angles of the conical surfaces may be freely adjusted depending on the size of a force expected to be output, e.g., the taper angles may be increased or decreased for the purpose of increasing or decreasing the friction to increase or decrease the force output. In order to make the contact between the contact surfaces S which are conical surfaces between the first portion 51 and the second portion 52 of the core ring fuller, there is a gap G between the first portion and the second portion at a position of outer rings of the contact surfaces which are conical surfaces between the first portion and the second portion of the core ring. If the entire contact surfaces are conical surfaces without a gap, a situation that the contact between the inner rings of the contact surfaces between the first portion 51 and the second portion 52 of the core ring is not full may be caused due to machining tolerance of the outer rings of the contact surfaces. The gap G provided in the outer rings avoids this problem. In the illustrated embodiment, the outer rings of the first portion 51 and the second portion 52 of the core ring are arranged to be flat surfaces perpendicular to an axial direction and oppositely disposed in parallel. In some embodiments, the first portion 51 and the second portion 52 of the core ring rotate around the same axis A.

In one specific embodiment illustrated in FIG. 5, the first portion 51 of the core ring has an opening for sleeving the fixed shaft 59 and is capable of rotating around the fixed shaft 59. From the drawing, it can be seen that the guide wheel 21 is also rotatably mounted on the fixed shaft 59 through a bearing. During normal operation, the guide wheel 21 rotates around the fixed shaft 59 while the core ring 23 is kept static until the centrifugal mechanism connected with the guide wheel 21 engages the outer ring of the first portion 51 of the core ring, thereby driving the first portion 51 of the core ring to rotate around the fixed shaft 59 and subsequently driving the second portion 52 of the core ring to rotate by virtue of friction. From the drawing, it can be seen that a bearing may be not provided between the first portion 51 of the core ring and the shaft 59. In a more specific embodiment, the first portion 51 of the core ring has a body 511, and a front side of the body 511 defines a surface 514 for frictional contact with the second portion 52 of the core ring. Under a situation that the contact surfaces S are conical surfaces, the front side of the body 511 of the first portion 51 of the core ring is formed as a convex conical surface or a concave conical surface. In some embodiments, a rear side of the body 511 of the first portion 51 of the core ring is in a shape matching a guide wheel 21. In the specific embodiment illustrated in FIG. 5, the rear side of the body 511 of the first portion 51 of the core ring defines a concave part 513 for accommodating a protruding portion of the guide wheel 21. Under a situation that the guide wheel 21 has no protruding portion, the rear side of the body 511 of the first portion 51 of the core ring may also be provided as a flat surface perpendicular to an axial direction. In the specific embodiment illustrated in FIG. 5, alternatively, at the first portion 51 of the core ring, a cylindrical contraction part 512 extends from an inner ring on the front side of the body 511 of the first portion 51 of the core ring, and the second portion 52 of the core ring is sleeved on the cylindrical contraction part 512 of the first portion 51 of the core ring.

In some embodiments, the second portion 52 of the core ring has a body 520. A rear side of the body 520 of the second portion 52 of the core ring defines a surface matching the convex conical surface or the convex conical surface of the first portion of the core ring, the surface being illustrated as a concave conical surface 521 in the drawing. In the specific embodiment illustrated in FIG. 5, the second portion 52 of the core ring has a cylindrical extension part 522. The cylindrical extension part 522 is provided thereon with a feature such as a connecting part connected with parts associated with the safety activating module, e.g., a bolt hole 523 or other types of connecting features. In some embodiments, a bearing, such as a thrust bearing 55, is provided between the cylindrical contraction part 512 of the first portion 51 and the cylindrical extension part 522 of the second portion 52, such that the second portion 52 of the core ring can rotatably sleeve the cylindrical contraction part 512 of the first portion 51 of the core ring in a rolling manner. In some embodiments, the pressure generation mechanism may also be provided between the cylindrical contraction part 512 of the first portion 51 of the core ring and the cylindrical extension part 522 of the second portion of the core ring. In one specific embodiment, the pressure generation mechanism may comprise an elastic device 56, such as one or multiple disc springs. One end of the elastic device 56 acts on the inner side of the second portion of the core ring, and the other end of the elastic device acts on a stopper 54 on the cylindrical contraction part 512 of the first portion 51 of the core ring directly or by virtue of the thrust bearing 55. In some embodiment, a thread is provided at a front end of the cylindrical contraction part 512, and the stopper 54 is a nut screwed onto the cylindrical contraction part 512. The pressure of the pressure generation mechanism may be adjusted by adjusting the tightness of the stopper 54, so as to adjust the pressure and friction force between the first portion and the second portion of the core ring. Besides, axial positioning of the entire core ring assembly may be realized through a clamping ring 57 provided on the shaft 59.

The second portion 52 of the core ring assembly 5 according to the embodiment of the present invention is only subject to a substantially constant friction force from the first portion 51 of the core ring. When the structure is determined, the output of the friction force only depends on a friction coefficient and a pressure between the first portion and the second portion of the core ring. The output force may be adjusted by adjusting the tightness or number of the elastic devices such as disc springs. In the core ring assembly according to the present invention, after the governor is actuated, the sheave is still allowed to rotate, so as to avoid sliding friction between the rope and the sheave as well as the problem caused thereby. Simultaneously, the first portion and the second portion of the governor can rotate relatively, excessive force will not be produced to output to the safety activating module at the moment of braking, and a greater impact will not be caused to the sheave or the rope due to a counteracting force, either. Under the situation of the core ring according to the present invention, regardless of the horizontal height of the car where the governor is braked, the tensile force exerted on the rope tends to be consistent or substantially consistent, such that the requirement on the rope does not change with the height of the building. Excessive impact is consumed due to the friction between the first portion and the second portion of the core ring. Besides, although FIG. 5 illustrates a detailed structure of the core ring assembly according to the specific embodiment of the present invention, it should be understood that the present invention is not limited by this specific structure. The concept of the present invention is to transfer a suitable force output for actuating the safety activating module by virtue of the friction between at least two portions of the split-type core ring assembly while filtering out the excessive force output by virtue of friction simultaneously, so as to at least solve or relieve the above-mentioned problem or other problems existing in the prior art. Therefore, the scope of the present invention shall not be limited by the specific embodiments.

According to other aspects of the present invention, the purpose of the present invention is further to provide various governors and elevator systems provided with the core ring assembly according to each embodiment of the present invention. Herein, the governor is preferably a car-mounted governor, and the second portion of the core ring assembly can be directly or indirectly connected to the safety activating module, such as a pulling rod of a security gear pulling mechanism.

The specific embodiments described above are just used for more clearly describing the principle of the present invention, and all parts are clearly illustrated or described such that the principle of the present invention can be more easily understood. One skilled in the art can easily make various modifications or variations to the present invention without departing from the scope of the present invention. Therefore, it should be understood that these modifications or variations are all included in the protective scope of patent of the present invention.

What is claimed is:

1. A core ring assembly for an elevator governor, wherein the core ring assembly comprises:
    a first portion and a second portion of a core ring which are axially arranged, the first portion and the second portion of the core ring having contact surfaces therebetween; and
    a pressure generation mechanism for generating a pressure between the first portion and the second portion of the core ring,
    wherein the first portion of the core ring rotates by receiving an actuation torque from an over-speed actuating mechanism, and the second portion of the core ring rotates by virtue of friction of the contact surfaces and enables a safety activating module;
    wherein the contact surfaces between the first portion and the second portion of the core ring are conical surfaces;
    wherein there is a gap, at outer rings of the contact surfaces which are conical surfaces, between the first portion and the second portion of the core ring.

2. The core ring assembly according to claim 1, wherein the first portion and the second portion of the core ring rotate around the same axis.

3. The core ring assembly according to claim 1, wherein the first portion of the core ring has an opening for sleeving a fixed shaft and is capable of rotating around the fixed shaft.

4. The core ring assembly according to claim 3, wherein the first portion of the core ring has a body, and a front side of the body of the first portion of the core ring defines a surface for frictional contact with the second portion of the core ring.

5. The core ring assembly according to claim 4, wherein the front side of the body of the first portion of the core ring is formed as a convex conical surface.

6. The core ring assembly according to claim 4, wherein a rear side of the body of the first portion of the core ring is in a shape matching a guide wheel.

7. A governor, wherein the governor comprises the core ring assembly according to claim 1.

8. The governor according to claim 7, wherein the governor is a car-mounted governor.

9. A core ring assembly for an elevator governor, wherein the core ring assembly comprises:
    a first portion and a second portion of a core ring which are axially arranged, the first portion and the second portion of the core ring having contact surfaces therebetween; and
    a pressure generation mechanism for generating a pressure between the first portion and the second portion of the core ring,
    wherein the first portion of the core ring rotates by receiving an actuation torque from an over-speed actuating mechanism, and the second portion of the core ring rotates by virtue of friction of the contact surfaces and enables a safety activating module;
    wherein the first portion of the core ring has an opening for sleeving a fixed shaft and is capable of rotating around the fixed shaft;
    wherein the first portion of the core ring has a body, and a front side of the body of the first portion of the core ring defines a surface for frictional contact with the second portion of the core ring;
    wherein the front side of the body of the first portion of the core ring is formed as a convex conical surface;
    wherein a cylindrical contraction part extends from an inner ring on the front side of the body of the first portion of the core ring, and the second portion of the core ring is sleeved on the cylindrical contraction part of the first portion of the core ring.

10. The core ring assembly according to claim 9, wherein a bearing is provided between the second portion of the core ring and the cylindrical contraction part of the first portion of the core ring.

11. The core ring assembly according to claim 9, wherein the second portion of the core ring has a body, and a rear side of the body of the second portion of the core ring defines a concave conical surface matching the convex conical surface of the first portion of the core ring.

12. The core ring assembly according to claim 9, wherein the second portion of the core ring has a cylindrical extension part, and the cylindrical extension part is provided thereon with a connecting part connected with the safety activating module.

13. The core ring assembly according to claim 12, wherein the pressure generation mechanism is disposed between the cylindrical contraction part of the first portion of the core ring and the cylindrical extension part of the second portion of the core ring.

14. The core ring assembly according to claim 13, wherein the pressure generation mechanism comprises an elastic device with one end acting on an inner side of the second portion of the core ring and the other end acting on a stopper on the cylindrical contraction part of the first portion of the core ring.

15. The core ring assembly according to claim 14, wherein a thrust bearing is provided between the elastic device and the stopper on the cylindrical contraction part of the first portion of the core ring.

16. The core ring assembly according to claim 14, wherein the elastic device is one or multiple disc springs.

17. The core ring assembly according to claim 14, wherein a thread is provided on the cylindrical contraction part, and the stopper is a nut screwed onto the cylindrical contraction part.

18. A governor, wherein the governor comprises a core ring assembly, including:
- a first portion and a second portion of a core ring which are axially arranged, the first portion and the second portion of the core ring having contact surfaces therebetween; and
- a pressure generation mechanism for generating a pressure between the first portion and the second portion of the core ring,
- wherein the first portion of the core ring rotates by receiving an actuation torque from an over-speed actuating mechanism, and the second portion of the core ring rotates by virtue of friction of the contact surfaces and enables a safety activating module;
- wherein the second portion of the core ring is connected with an elevator safety gear pull rod.

19. An elevator system, wherein the elevator system comprises the governor according to claim 18.

\* \* \* \* \*